H. NOFFKE.
LATHE CHUCK LIFTING AND SUPPORTING DEVICE.
APPLICATION FILED JAN. 24, 1919.
1,316,634.
Patented Sept. 23, 1919.
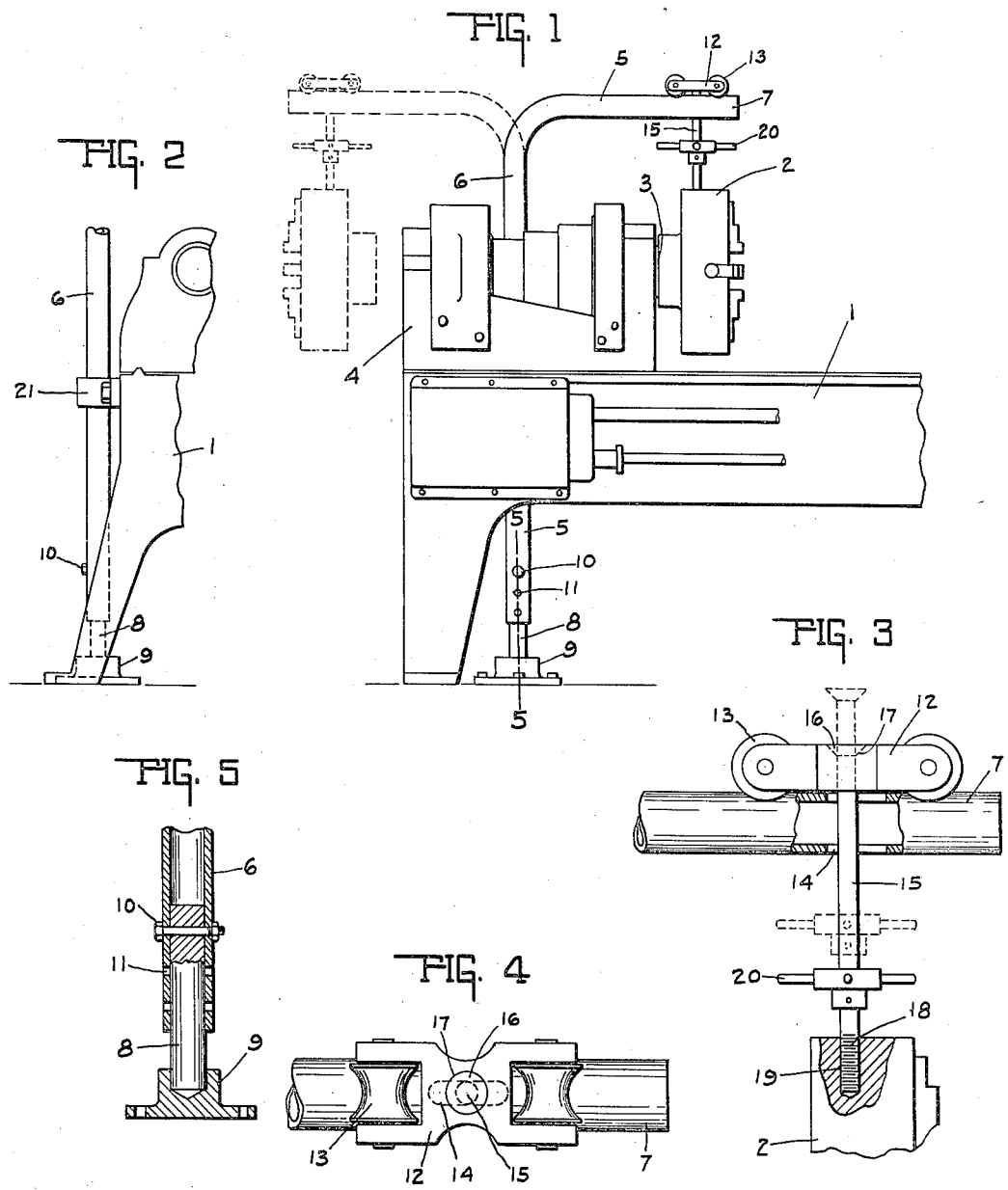
WITNESS:
INVENTOR.
HARRY NOFFKE
BY
Lockwood & Lockwood
ATTORNEY

UNITED STATES PATENT OFFICE.

HARRY NOFFKE, OF INDIANAPOLIS, INDIANA.

LATHE-CHUCK LIFTING AND SUPPORTING DEVICE.

1,316,634.   Specification of Letters Patent.   Patented Sept. 23, 1919.

Application filed January 24, 1919. Serial No. 272,927.

*To all whom it may concern:*

Be it known that I, HARRY NOFFKE, a citizen of the United States, and a resident of Indianapolis, county of Marion, and State of Indiana, have invented a certain new and useful Lathe-Chuck Lifting and Supporting Device; and I do hereby declare that the following is a full, clear, and exact description thereof, reference being had to the accompanying drawings, in which like numerals refer to like parts.

This invention relates to a lathe chuck lifting and supporting device, and the prime feature of the invention is the provision of means for engagement with a lathe chuck for lifting and supporting the same when the chuck is being attached to or removed from the lathe.

A further feature of the invention is the provision of a swiveled supporting crane, or derrick from which a chuck supporting means is suspended whereby the chuck may be swung in the arc of a circle to dispose the same out of engagement with the lathe, and position the same so that it will be entirely out of the road when the lathe is being used for other purposes.

A further feature of the invention is the provision of means for permitting the chuck supporting mechanism to have movement on the crane to compensate for the movement of the chuck as it is being engaged with or disengaged from the lathe.

A further feature of the invention is the provision of means for increasing or decreasing the height of the crane to adapt the same for use in connection with lathes of different heights.

Other objects and advantages will be more fully set forth in the accompanying specification.

In the drawings, which are made a part of this application, Figure 1 is a side elevation of a lathe showing the chuck supporting means in position to receive and support the chuck by full lines and showing the position of the chuck and crane removed from the lathe by dotted lines. Fig. 2 is a fragmentary end elevation of the lathe showing the manner of mounting the crane thereon. Fig. 3 is an enlarged elevation of the chuck supporting means and one end of the crane, parts being broken away, and parts being shown in elevated position by dotted lines. Fig. 4 is a top plan view thereof and Fig. 5 is an enlarged sectional view as seen on line 5—5 Fig. 1.

Referring to the drawings, in which similar reference numerals designate corresponding parts throughout the several views, 1 indicates a lathe bed, 2 indicates a chuck, 3 a shaft for operating the chuck and 4 the supporting head for said shaft, all of said parts being of the usual or any preferred construction.

Heretofore great difficulty has been experienced in removing and installing the chuck in view of its weight, the chuck frequently striking parts of the lathe and sometimes greatly injuring said parts so that they have to be renewed, or so marring them that they will injure the parts of the supporting head, as it is moved over the lathe body, to such an extent as to render the same unfit for use.

To this end, therefore, means is provided for supporting the weight of the chuck while it is being attached to or removed from its operating shaft, and likewise to support the chuck while it is being removed from position over the lathe, comprising a crane or derrick 5, preferably constructed of a hollow tube and having a vertical portion 6 and a horizontal portion 7. The lower end of the vertical portion 6 is telescopically engaged with a pintle 8, the lower end of which fits into a socket 9 attached to the floor or base upon which the lathe is mounted, and in order to adapt the crane for use in connection with lathes of varying heights a bolt 10 is extended transversely through the lower end of the member 6 and through the pintle 8, the member 6 of the crane having a plurality of openings 11 so that it can be adjusted vertically on the pintle.

Mounted upon the horizontal portion 7 of the crane is a carriage 12, at each end of which is a grooved roller 13, which roller engages the surface of the member 7 and supports the carriage thereon. Extending vertically through the carriage 12 and through elongated slots 14 in the crane section 7 is a supporting shaft 15, the upper end of which is provided with a flared head 16 which fits in the flared recess 17 in the upper face of the carriage 12 and limits the downward movement of the supporting shaft. The lower end of the supporting shaft 15 is provided with threads 18 which are adapted to enter a threaded bore 19 in the chuck 2, the supporting shaft being rotated to turn the threads into or out of the bore by any suitable means, such as a hand wheel 20.

In applying the chuck supporting device to use the socket 9 is secured to the floor or support upon which the lathe sits and the vertical portion 6 of the crane then introduced through a bearing 21 attached at any convenient point upon the lathe body, the lower end of the crane being then attached to the pintle 8 and lowered until the pintle enters the socket 9. If the chuck is in position upon the shaft 3, the horizontal portion of the crane 7 is then swung in the arc of a circle until the supporting shaft 15 is positioned over the bore 19 of the chuck, the supporting shaft during this operation being manually elevated so that the threaded end of the shaft will pass over the chuck. When the supporting shaft is in proper position it is lowered. The supporting shaft 15 is then rotated through the medium of the hand wheel until the threaded end of said shaft has entered in the bore 19 the proper distance. Reverse rotation is then imparted to the shaft 3 which will unscrew the chuck from said shaft and it will be readily seen that in view of the elongated slots 14 the carriage 12 will gradually move forward as the chuck is unscrewed from the shaft 3. As soon as the chuck is released from the shaft 3 the crane may be swung to any suitable position away from the lathe, and if it is the intention to again use the chuck in the near future it is left suspended from the crane, and as it is positioned a distance from the lathe it will not interfere with the usual operation of the lathe or be in the road of the attendant for the lathe.

When it is again desired to use the chuck the crane is again rotated until the chuck is swung into position over the lathe body, and as the chuck is in the same position as it was when originally removed from the shaft it will be in position to again engage the shaft. The head portion of the chuck is then brought into position to engage the threads of the shaft 3 by moving the carriage longitudinally of the horizontal portion of the crane, and power applied to the shaft 3 which drives the same forwardly so as to cause the threaded end of the shaft to enter the head of the chuck. As soon as the chuck has been properly engaged with the shaft 3 the supporting shaft 15 is manually operated to unscrew the same from the bore 19, the supporting shaft moving freely through the carriage without disturbing the position thereof on the crane. The horizontal portion of the crane is then swung away from position over the lathe.

Although this invention is shown and described as used primarily for supporting and handling chucks for lathes it will be readily understood that the same may be as conveniently used for supporting and handling various other heavy objects or parts of machinery, the operation thereof being the same in all instances.

It will likewise be seen that this device can be very cheaply constructed and readily installed for use without displacing or disturbing any parts of the machinery with which it coöperates, and instead of providing a bearing on parts of the machinery any suitable supporting means for the crane may be provided.

The invention claimed is:

1. The combination with a lathe and a chuck therefor, of means for supporting and transporting said chuck when released from the lathe, said means holding said chuck against rotation while being engaged with or disengaged from parts of the lathe.

2. An object supporting means, including a crane structure having a vertical portion and a horizontal portion, means for changing the height of said crane structure, and a supporting shaft carried by the horizontal portion of the crane structure.

3. An object supporting means including a crane structure having a horizontal portion, a carriage mounted on the horizontal portion of the crane structure, an object supporting shaft carried by and vertically movable through said carriage, and means for operating said shaft for engaging and disengaging the same from the object to be supported.

4. An object supporting means including a crane structure having a horizontal portion, a carriage on said horizontal portion of the crane structure, an object supporting shaft carried thereby and vertically movable through said carriage with an enlargement on the upper end thereof for limiting the downward movement of the shaft and supporting the same, and means for operating said shaft for engaging or disengaging the same with an object.

5. An object supporting means comprising a crane structure having a vertical portion and a horizontal portion, a pintle coöperating with the vertical portion, means for regulating the height of the crane structure, a carriage mounted upon the horizontal portion of the crane structure, an object supporting shaft carried thereby and vertically movable through said carriage, and means for operating said shaft for engaging and disengaging the same with an object.

6. An object supporting means including a crane structure having a horizontal portion, a carriage movable thereon, an object supporting shaft extending and vertically movable through both said carriage and the horizontal portion of the crane structure, and means for operating said shaft for engaging and disengaging the same with an object.

7. An object supporting means, including a crane structure, parts of the crane structure having alining elongated slots, a carriage movable on parts of the crane structure and over said slots, an object supporting shaft extending through said carriage and slots and vertically movable through the carriage, and means for operating said supporting shaft for engaging the same with an object.

In witness whereof I have hereunto affixed by signature.

HARRY NOFFKE.